United States Patent
Ku et al.

(10) Patent No.: US 9,318,231 B2
(45) Date of Patent: Apr. 19, 2016

(54) METHOD OF PREPARING REDUCED GRAPHENE OXIDE AND REDUCED GRAPHENE OXIDE-POLYMER COMPOSITES

(75) Inventors: Bon-Cheol Ku, Jeollabuk-do (KR); Ok-kyung Park, Jeollanam-do (KR); Sung Ho Lee, Gyeonggi-do (KR); Seok In Na, Gwangju (KR); Han Ik Jo, Seoul (KR); Jun Kyung Kim, Seoul (KR); Joong Hee Lee, Jeollabuk-Do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 1003 days.

(21) Appl. No.: 13/410,465

(22) Filed: Mar. 2, 2012

(65) Prior Publication Data

US 2012/0302683 A1    Nov. 29, 2012

(30) Foreign Application Priority Data

May 25, 2011   (KR) .................. 10-2011-0049802

(51) Int. Cl.
  *C08G 18/63*     (2006.01)
  *H01B 1/04*      (2006.01)
  (Continued)

(52) U.S. Cl.
  CPC . *H01B 1/04* (2013.01); *B82Y 30/00* (2013.01); *B82Y 40/00* (2013.01); *C01B 31/043* (2013.01); *C01B 31/0484* (2013.01); *C08G 61/10* (2013.01); *C08K 3/00* (2013.01); *C08K 3/04* (2013.01); *C09C 1/44* (2013.01); *C01P 2002/72* (2013.01); *C01P 2002/82* (2013.01);
  (Continued)

(58) Field of Classification Search
  CPC .............. C09C 1/44; C09C 1/46; C08K 3/04; H04B 1/04; C01B 31/00; C01B 31/04; C01B 31/043; C01B 31/0484; C01B 2204/20; C01B 2204/22; C01B 2204/28
  USPC .................. 568/959; 523/200; 524/700
  See application file for complete search history.

(56) References Cited

U.S. PATENT DOCUMENTS

| | | | |
|---|---|---|---|
| 9,039,938 B2 * | 5/2015 | Crain .................. | C09D 5/24 252/378 R |
| 2007/0092432 A1 * | 4/2007 | Prud'Homme ....... | C01B 31/043 423/448 |

(Continued)

FOREIGN PATENT DOCUMENTS

KR    1020110016289 A    2/2011

OTHER PUBLICATIONS

Park et al. "In situ synthesis of thermochemically reduced graphene oxide conducting nanocomposites", Nano Letters, 2012, 12, 1789-1793. Published online Jan. 19, 2012, plus supporting information.*

(Continued)

*Primary Examiner* — Jane L Stanley
(74) *Attorney, Agent, or Firm* — Ladas & Parry LLP (57) ABSTRACT

Methods of preparing reduced graphene oxide and reduced graphene oxide-polymer composites. The methods include covalently binding a halogen-substituted aromatic compounds to a graphene oxide and heat treating the graphene oxide with the halogen-substituted aromatic compounds covalently bound thereto at a low temperature, for example, 450° C. or less. By using the methods, reduced graphene oxide and reduced graphene oxide-polymer composites that have high electrical conductivities (e.g., 30,000 S/m or more) may be obtained.

13 Claims, 8 Drawing Sheets

(51) Int. Cl.
*C09C 1/44* (2006.01)
*C01B 31/04* (2006.01)
*C08G 61/10* (2006.01)
*B82Y 30/00* (2011.01)
*B82Y 40/00* (2011.01)
*C08K 3/00* (2006.01)
*C08K 3/04* (2006.01)

(52) U.S. Cl.
CPC ......... *C01P2002/88* (2013.01); *C01P 2004/04* (2013.01); *C01P 2006/40* (2013.01); *C08G 2261/314* (2013.01)

(56) References Cited

U.S. PATENT DOCUMENTS

| | | | |
|---|---|---|---|
| 2011/0017587 A1* | 1/2011 | Zhamu | B82Y 30/00 204/157.62 |
| 2011/0059871 A1 | 3/2011 | Tour et al. | |
| 2013/0079552 A1* | 3/2013 | Lee | B01D 69/08 562/488 |
| 2015/0151973 A1* | 6/2015 | Lee | B82Y 30/00 427/185 |

OTHER PUBLICATIONS

Lomeda et al. "Diazonium functionalization of surfactant-wrapped chemically converted graphene sheets", JACS, 2008, 130, 16201-16206. Published online Jan. 8, 2008.*

Sun et al. "Soluble graphene through edge-selective functionalization", Nano Res, 2010, 3, 117-125. published online Feb. 2010.*

Su et al. "towards free-standing graphene/carbon nanotube composite films via acetylene-assisted thermolysis of organocobalt functionalized graphene sheets", Chem. Commun., 2010, 46, 8279-8281. Published online Sep. 2010.*

Viet Hung Pham, et al; "One-step synthesis of superior dispersion of chemically converted graphene in organic solvents", Chemical Communications, Issue 24; Publication Date: May 17, 2010; pp. 4375-4377.

Hua Bai, et al; "Functional Composite Materials Based on Chemically Converted Graphene", Advanced Materials, vol. 23, Issue 9, pp. 1089-1115, Mar. 4, 2011.

* cited by examiner

METHOD OF PREPARING REDUCED GRAPHENE OXIDE AND REDUCED GRAPHENE OXIDE-POLYMER COMPOSITES

CROSS-REFERENCE TO RELATED PATENT APPLICATION

This application claims the benefit of Korean Patent Application No. 10-2011-0049802, filed on May 25, 2011, in the Korean Intellectual Property Office, the disclosure of which is incorporated herein in its entirety by reference.

BACKGROUND OF THE INVENTION

1. Field of the Invention

Aspects of the present invention relate to methods of preparing a reduced graphene oxide (RGO) and an RGO-polymer composites, and more particularly, to methods of preparing an RGO and an RGO-polymer composites that have high electrical conductivities from graphene oxide.

2. Description of the Related Art

Graphite oxides or graphene oxides oxidized from graphite have high dispersibility with respect to a hydrophilic solvent, but they have low electrical conductivity ($3.7 \times 10^{-7}$ S/cm), and thus, they are not suitable for use in applications requiring high electrical conductivity. Thus, to address this problem, the reduction of graphene oxide is needed. As a method of reducing graphene oxide, a chemical reduction method and a thermal reduction method are known.

The chemical reduction method is performed using various reducing agents, such as $NaBH_4$, HI/AcOH, NaOH/KOH/$NH_3$, metal, phenylhydrazine, and the like, and graphene with tens to hundreds S/cm of electrical conductivity can be mass-synthesized by using the chemical reduction method. In the case of reduced graphenes, however, they tend to agglomerate to each other by the Van der Waals' Force and thus it is difficult to uniformly disperse the graphenes in a solvent (<1 mg/mL). Therefore, to prepare graphene-polymer composites in which graphene is uniformly dispersed in a solvent, graphene needs to be redispersed in a solvent.

In the thermal reduction method, graphene oxide is generally heat treated at high temperatures (1,000° C. or more), and graphene having an electrical conductivity of 55,000 to 100,000 S/m is obtained. However, the thermal reduction method is performed at high temperatures and thus energy loss problems may occur.

SUMMARY OF THE INVENTION

The present invention provides a method of preparing a reduced graphene oxide that has high electrical conductivity and provides advantages to a manufacturing process in that graphene oxide is heat treated at a relatively lower temperature than a general heat treatment temperature (below 450° C.).

The present invention also provides a method of preparing reduced graphene oxide-polymer composites.

The present invention also provides reduced graphene oxide prepared using the method and having high electrical conductivity.

The present invention also provides reduced graphene oxide-polymer composites prepared using the method and having high electrical conductivities.

According to an aspect of the present invention, there is provided a method of preparing a reduced graphene oxide, the method including: mixing a graphene oxide and a halogen-substituted aromatic compounds; stirring the mixture to obtain a graphene oxide with the halogen-substituted aromatic compounds covalently bound thereto; and heat treating the graphene oxide with the halogen-substituted aromatic compounds covalently bound thereto at a temperature in a range of 100 to 450° C.

According to another aspect of the present invention, there is provided method of preparing reduced graphene oxide-polymer composites, the method including: mixing a graphene oxide and halogen-substituted aromatic compounds; stirring the mixture to obtain a graphene oxide with the halogen-substituted aromatic compounds covalently bound thereto; mixing the graphene oxide with the halogen-substituted aromatic compounds covalently bound thereto and a heat-resistant polymer precursors and drying the mixture to obtain a graphene oxide-polymer precursor composites; and heat treating the graphene oxide-polymer precursor composites at a temperature in a range of 100 to 450° C.

According to another aspect of the present invention, there is provided a reduced graphene oxide prepared using the method described above and having an electrical conductivity in a range of 10 to 100,000 S/m.

According to another aspect of the present invention, there is provided reduced graphene oxide-polymer composites prepared using the method described above and having an electrical conductivity in a range of 0.01 to 1,000 S/m.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings. As used herein, the term "and/or" includes any and all combinations of one or more of the associated listed items. Expressions such as "at least one of," when preceding a list of elements, modify the entire list of elements and do not modify the individual elements of the list.

According to an embodiment of the present invention, a method of preparing a reduced graphene oxide (RGO)

includes mixing graphene oxide and halogen-substituted aromatic compounds; stirring the mixture to obtain graphene oxide to which the halogen-substituted aromatic compounds are covalently bound; and heat treating the graphene oxide to which the halogen-substituted aromatic compounds are covalently bound at a temperature in the range of 100 to 450° C.

In one embodiment, by increasing a degree of reduction of graphene oxide, an RGO may be prepared even by heat treatment at a low temperature, i.e., 450° C. or less.

The graphene oxide used to prepare the RGO may be prepared by oxidizing graphite using a general method.

The term "graphene oxide" used herein refers to an oxide prepared by oxidizing graphite and thus is understood to include graphite oxide. The graphene oxide has a structure in which a carbon layer includes an oxygen-containing group such as a hydroxyl group, an epoxide group, a carboxyl group, or a ketone group. The graphene oxide is distinguished from graphite since the graphene oxide can be dispersed in a solution, and thus can be formed as a thin layer. Thus, when the graphene oxide is formed as a thin film by using the graphene oxide dispersion solution and the thin film is then reduced, graphene in the form of a sheet may be formed. The acronym RGO used herein indicates a compound prepared by reducing the graphene oxide.

The term "graphene" as used herein refers to polycyclic aromatic molecules consisting of a plurality of carbon atoms covalently bonded to each other. The covalently bonded carbon atoms may form a 6-membered ring as a repeating unit, or may further include a 5-membered ring and/or a 7-membered ring. Thus, the graphene appears as a single layer of covalently bonded carbon atoms (usually, bonded via a sp$^2$ bond). The graphene may have various structures that may vary according to the number of 5-membered rings and/or 7-membered rings. The graphene may be formed as a single layer of graphene. Alternatively, the graphene may be formed as multiple layers of mono layer graphene sheets stacked upon one another. In this regard, the graphene may have a maximum thickness of 100 below nm. Generally, the side ends of the graphene are saturated with hydrogen atoms.

The RGO has types and physical properties that are similar to those of the graphene described above, but has somewhat different electrical properties from the graphene. In particular, the RGO has decreased conductivity.

The RGO does not have a full graphene structure (C═C/C—C conjugated structure) and has less C═C bonds than graphene. In other words, since oxygen atoms or nitrogen atoms are partially mixed between carbon atoms, the RGO has various band-gaps.

The graphene oxide may be prepared by treating graphite with a strong acid. In particular, the graphene oxide may be prepared by adding a strong acid such as sulfuric acid and an oxidizing agent such as potassium permanganate to graphite, heating the mixture to induce a reaction therebetween, cooling the reaction product to room temperature, and adding an oxidizing agent such as hydrogen peroxide thereto to oxidize the graphite.

Halogen-substituted aromatic compounds are added to the prepared graphene oxide and mixed together and the mixture is stirred, thereby obtaining the graphene oxide to which the halogen-substituted aromatic compounds are covalently bound.

The halogen-substituted aromatic compounds may be a compound represented by Formula 1 below:

R—Ar-L <Formula 1> wherein R is H or a halogen atom, Ar is a substituted or unsubstituted $C_6$-$C_{14}$ aromatic ring, L is —OH, —COOH, —NH$_2$, —N$_2^+$X$^-$, or —NH—NH$_2$ where X$^-$ is a monovalent counter anion, and provided that R is H, Ar is substituted with at least one halogen atom.

In Formula 1, Ar may be a phenylene group, a naphthylene group, or an anthracenylene group.

In Formula 1, if R is a halogen atom, the halogen atom may be iodine (I).

In Formula 1, Ar may be substituted with a halogen atom or a $C_1$-$C_4$ alkyl group.

In Formula 1, X$^-$ may be BF$_4^-$, Cl$^-$, or HSO$_4^-$.

The halogen-substituted aromatic compound of Formula 1 may be one of the compounds below:

For example, a graphene oxide with halogen-substituted phenyl bound thereto may be prepared by dispersing graphene oxide in a sulfuric acid solution or an acetic acid solution and adding a halogen-substituted aniline compound and sodium nitride (NaNO$_2$) thereto, or by adding a halogen-substituted aniline compound and isoamyl nitrite to the graphene oxide, stirring the mixture at a temperature ranging from 50 to 60° C. to obtain graphene oxide with a halogen-substituted phenyldiazonium that is covalently bound on a plane or an edge thereof, and washing and drying the resultant graphene oxide.

Alternatively, the graphene oxide with halogen-substituted phenyl bound thereto may be prepared by directly adding halogen-substituted phenyldiazonium to a graphene oxide, stirring the mixture at a temperature ranging from 50 to 60° C. to obtain a graphene oxide with the halogen-substituted phenyldiazonium bound thereto, and washing and drying the resultant graphene oxide.

The amount of the halogen-substituted aromatic compounds may be in the range of 1 to 30 parts by weight based on 100 parts by weight of the graphene oxide. If the amount of the halogen-substituted aromatic compound is within this range, the reduction of a graphene oxide may successfully occur.

The graphene oxide with the halogen-substituted aromatic compounds covalently bound thereto may be represented by Formula 2:

R—Ar-L'-GO <Formula 2> wherein R and Ar are the same as defined in Formula 1,
GO denotes a graphene oxide,
L' is —OCO—, —NHCO—, —CO—, or a direct bond.

In other words, a covalent bond is formed between carbon atoms of the halogen-substituted aromatic compounds and carbon atoms of the graphene oxide. The covalent bond between the halogen-substituted aromatic compounds and the graphene oxide may be formed on a plane or an edge of the graphene oxide. In particular, when the covalent bond therebetween is formed on the edge of the graphene oxide, the covalent bond indicates a ketone-forming reaction by Friedel-Crafts acylation.

Figure 1A:
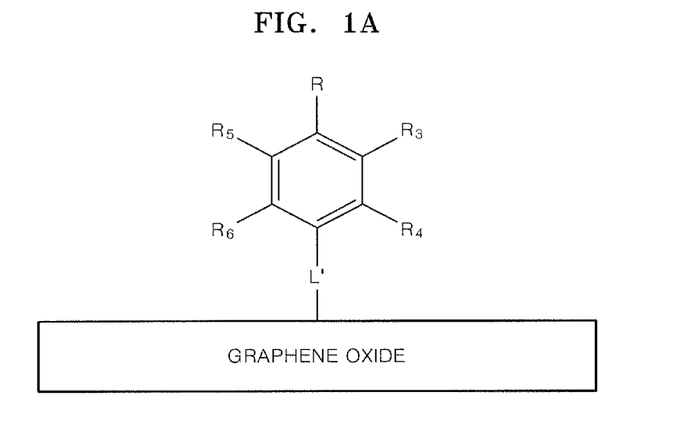
FIGS. 1A through 1C are schematic diagrams illustrating a structure in which halogen-substituted aromatic compounds are covalently bound to graphene oxide on a surface or an edge portion of graphene, according to embodiments of the present invention.
Figure 1B:
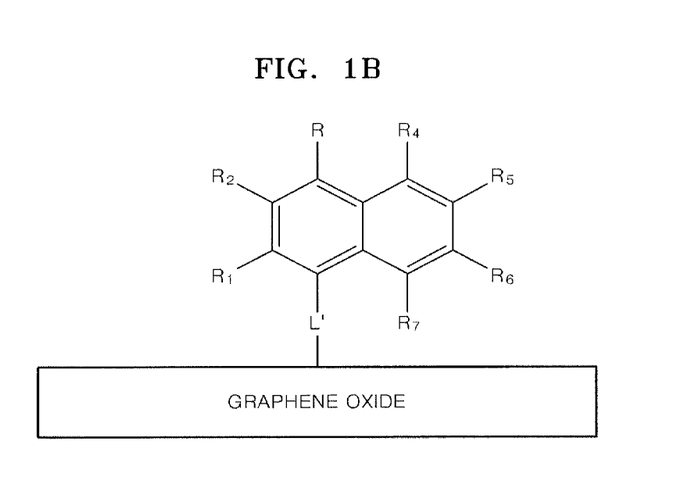
Figure 1C:
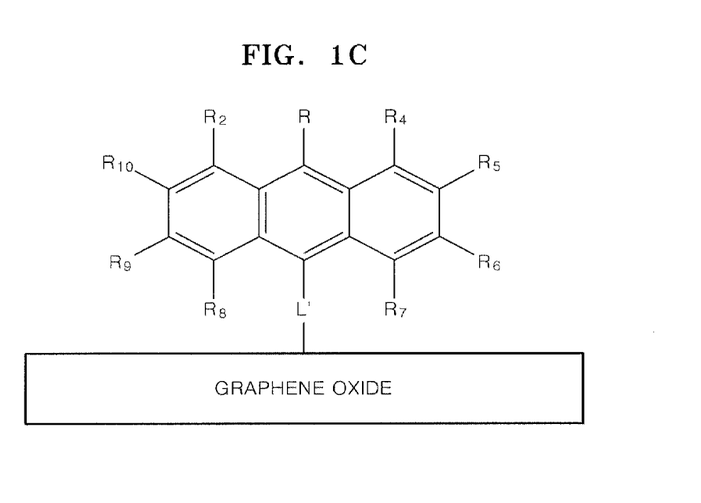

FIGS. 1A through 1C are schematic diagrams illustrating a structure in which a halogen-substituted aromatic compound is covalently bound to a graphene oxide on a surface or an edge portion of graphene, according to embodiments of the present invention.

In FIGS. 1A through 1C, L' and R are the same as defined in Formula 2, $R_1$ through $R_8$ are each independently a hydrogen atom, a halogen atom, or a $C_1$-$C_4$ alkyl group, provided that R is H, at least one of $R_1$ through $R_8$ is a halogen atom.

In this regard, the halogen-substituted aromatic compounds may be halogen-substituted aromatic hydrazine, for example, halogen-substituted phenyl hydrazine or halogen-substituted naphthyl hydrazine.

The graphene oxide with the halogen-substituted aromatic compounds covalently bound thereto may be heat treated at a temperature in the range of 100 to 450° C., for example, in the range of 250 to 450° C., thereby obtaining an RGO.

The heat treatment process may be performed for 1 to 10 hours in air or in a air atmosphere.

In the method of preparing an RGO, the graphene oxide with the halogen-substituted aromatic compounds covalently bound thereto is used, and thus, an RGO may be prepared at a lower temperature (e.g., 450° C. or less) than a heat treatment temperature of a conventional graphene oxide, for example, 1000° C. or higher. In other words, a substituted halogen atom, for example, iodine (I) atom in an aromatic compound becomes hydrogen iodide (HI) in an air atmosphere, the produced HI facilitates deoxygenation of an oxygen-containing group of the graphene oxide, such as a hydroxyl group, an epoxide group, or a carboxyl group, and carbonization thereof is induced so that a carbon-carbon bond ($sp^2$) is more completely formed, whereby an RGO with high conductivity may be obtained.

The halogen-substituted aromatic hydrazine may form a compound having an indole structure by [3,3]-sigmatropic rearrangement with a ketone group or an aldehyde group of a graphene oxide, and may be heat treated so that a halogen atom combines with a hydrogen atom to form halogenated hydrogen (e.g., HI), and an additional reduction reaction which removes remaining oxygen groups occurs, accordingly.

For example, the [3,3]-sigmatropic rearrangement may be carried out on phenylhydrazine iodide according to Reaction Scheme below:

Phenylhydrazine iodide indole iodide wherein $R_1$ and $R_2$ each independently indicate a carbon-carbon bond existing in graphene oxide.

That is, graphene oxide is reduced according to the reaction and further reduced by halogenated hydrogen.

According to another embodiment of the present invention, there is provided an RGO prepared using the method described above and having an electrical conductivity in the range of 10 to 100,000 S/m. For example, the electrical conductivity of the RGO may be in the range of 100 to 100,000 S/m. The RGO prepared using the method has a far higher electrical conductivity than that of an RGO prepared using a conventional method. This is because reducing properties of graphene oxide are improved by binding a halogen-substituted aromatic compounds to graphene oxide. In other words, when the method described above is used, graphene oxide is reduced by halogenated hydrogen at a low temperature and thermal reduction thereof simultaneously occurs (thermochemical reduction), and thus, the RGO prepared using the method described above provides better effects at the same temperature than an RGO prepared by thermally reducing graphene oxide. Therefore, the RGO has improved conductivity.

According to another embodiment of the present invention, a method of preparing an RGO-polymer composites includes mixing a graphene oxide and a halogen-substituted aromatic compounds; stirring the mixture to obtain a graphene oxide with the halogen-substituted aromatic compounds covalently bound thereto; mixing the graphene oxide with the halogen-substituted aromatic compounds covalently bound thereto and a heat-resistant polymer precursors, and drying the resultant mixture to obtain a graphene oxide-polymer precursor composites; and heat treating the graphene oxide-polymer precursor composites at a temperature in the range of 100 to 450° C.

As described above, the graphene oxide may be prepared by treating graphite with a strong acid.

The graphene oxide and the halogen-substituted aromatic compounds are already described above, and thus a detailed description thereof is not provided herein.

The heat-resistant polymer precursors may be a polyimide precursor (e.g., polyamic acid (PAA)), a carbon fiber precursor (e.g., polyacrylonitrile (PAN)), or a precursor of polybenzoxazole (PBO), such as hydroxyl-containing PAA or hydroxyl-containing polyamide.

The amount of the graphene oxide with the halogen-substituted aromatic compounds covalently bound thereto may be in the range of 1 to 40 parts by weight based on 100 parts by weight of the polymer precursors.

The mixture of the graphene oxide with the halogen-substituted aromatic compounds covalently bound thereto and the heat-resistant polymer precursors is dried to obtain a composites in which the graphene oxide is dispersed in the polymer precursors. Then, the graphene oxide-polymer precursor composites are heat treated at a temperature in the range of 100 to 450° C. so that the polymer precursors are converted to polymers and the graphene oxide is converted to an RGO. In this regard, as described above, a halogen atom existing in the halogen-substituted aromatic compounds facilitates a reduction of the graphene oxide and thus even when the graphene oxide-polymer precursor composites are heat treated at 450° C. or less, RGO-polymer composites with high electrical conductivity may be obtained.

The heat treatment process may be performed step-by-step: at 100 to 150° C. for 2 hours, at 150 to 200° C. for 30 minutes, at 200 to 300° C. for 1 hour, and at 300 to 450° C. for 30 minutes.

According to another embodiment of the present invention, methods of preparing RGO-polymer composites include mixing a graphene oxide and a halogen-substituted aromatic compounds; stirring the mixture to obtain a graphene oxide with the halogen-substituted aromatic compounds covalently bound thereto; mixing the graphene oxide with the halogen-substituted aromatic compounds covalently bound thereto and a monomer for polymerization; and heat treating the mixture at a temperature in the range of 100 to 450° C.

In other words, the method described above is a process whereby the graphene oxide with the halogen-substituted aromatic compounds covalently bound thereto is mixed with the monomers for polymerization and then polymerization of the monomers simultaneously occurs in the heat treatment process for reduction. When the monomer for polymerization is used, the graphene oxide may have high dispersibility with respect to the polymers and a total reaction time may be shortened.

The amount of the halogen-substituted aromatic compounds may be in the range of 1 to 40 parts by weight based on 100 parts by weight of the monomer.

For the polymerization of the monomers, a polymerization catalyst, a polymerization initiator, a thermal stabilizer, and an antioxidant may be further added to the mixture of the monomers and the graphene oxide, if needed.

In the reduced graphene oxide-polymer composites, examples of the polymer include, but are not limited to, polyolefin, polyester, polyamide, polybenzimidazole (PBI), and PBO. The polymer may be appropriately selected according to a desired application.

For example, PBI is prepared by polymerization of the following monomers according to a Reaction Scheme below. Thus, when the monomers below and a halogen-substituted aromatic compounds are used together, polymerization of the monomers and the formation of a covalent bond between the halogen-substituted aromatic compounds and a graphene oxide may simultaneously occur:

the polymer precursors may be changed and the graphene oxide may also be reduced. Therefore, an RGO-polymer composites with high electrical conductivity may be easily prepared.

According to another embodiment of the present invention, there is provided an RGO-polymer composites prepared using the method described above and having an electrical conductivity in the range of 0.01 to 1,000 S/m. The RGO prepared using the method has a far higher electrical conductivity than that of an RGO prepared using a conventional method. This is considered because the reducing properties of graphene oxide are improved by covalently binding a halogen-substituted aromatic compounds to graphene oxide. In addition, even after the halogen-substituted aromatic compounds are covalently bound to the graphene oxide, the dispersibility of the graphene oxide with the halogen-substituted aromatic compounds covalently bound thereto is maintained the same as that of a preexisting graphene oxide and thus an RGO-polymer composites with high dispersibility may be prepared.

One or more embodiments of the present invention will now be described more fully with reference to the following examples. However, these examples are provided only for illustrative purposes and are not intended to limit the scope of the present invention.

Preparation Example 1

Preparation of Graphene Oxide 1 g of graphite (fluka, ~350 mesh) and 50 mL of sulfuric acid (98%, available from Daejung) was mixed at room temperature, and 6 g of potassium permanganate (Aldrich) was slowly added thereto. After the oxidizing agent was added, the mixed resultant was stirred while heating at 45° C. for 12 hours and the temperature thereof was decreased to room temperature. 80 mL of distilled water was slowly added to the In the method described above, since the graphene oxide with the halogen-substituted aromatic compounds covalently bound thereto is dispersed in the polymer precursors or the monomers, it has high dispersibility with respect to a polar solvents (e.g., DMF, DMSO, NMP, and DMAc). In addition, the graphene oxide with the halogen-substituted aromatic compounds covalently bound thereto is heat treated at 450° C. or less, which is a heat treatment temperature of the heat-resistant polymer precursors, whereby a chemical structure of reaction solution. When the temperature of the reaction solution was decreased to room temperature while the reaction solution was stirred, 200 mL of distilled water was added again thereto, and 6 mL of hydrogen peroxide (35 wt % aqueous solution, Aldrich) was dropwise added to the reaction solution until the reaction solution turned yellow. Then, once the temperature of the yellow graphene oxide dispersion was decreased to room temperature while the yellow graphene oxide dispersion was stirred for 30 minutes, the yellow graphene oxide dispersion was put in a centrifuge tube and centrifuged at 5000 rpm for 1 hour to precipitate the graphene oxide. After centrifugation, a supernatant was removed therefrom, 60 mL of distilled water was further added to the dispersion and the resultant dispersion was ultrasonically treated for 10 minutes to prepare a uniform dispersion, and the uniform dispersion was centrifuged again at 5,000 rpm for 1 hour. The centrifugation process was repeated three times to remove an excess amount of acid, and the obtained graphene oxide slurry was put in a dialysis tube (Spectrumlab, Mw cut-off: 6,000~9,000) and then neutralized until the pH thereof reached 7. The neutralized graphene oxide slurry was freeze-dried at −45° C. for 2 days and then dried again at 50☐ for 1 day to obtain a graphene oxide.

The graphene oxide was prepared as a suspension (1 mg/1 mL) in which 1 mg of the graphene oxide was dispersed with respect to 1 mL of N-methylpyrrolidone (NMP) as a solvent, and the dispersibility and dispersion stability of the graphene oxide in the solvent of the suspension were evaluated by observing a change in the suspension over time. The graphene oxide was uniformly dispersed in NMP and was stably dispersed in the solvent even after 24 hours.

The finally obtained graphene oxide powder was dispersed in DMF in an amount of 0.1 parts by weight based on 100 parts by weight of DMF to prepare a dispersion, the dispersion was spin coated on a silicon wafer, and an electrical conductivity of the coated silicon wafer was then measured using a 4-point probe method. The electrical conductivity of the non-heat-treated graphene oxide film was $3.7 \times 10^{-5}$ S/m.

Preparation Example 2

Preparation of Graphene Oxide with Iodine-substituted Phenyl Covalently Bound Thereto (I-Ph-Go)

0.1 g of the graphene oxide prepared according to Preparation Example 1 was added to 100 mL of a $H_2SO_4$ solution, the resultant was ultrasonically treated for 30 minutes, the dispersion was put in a reactor, and the temperature of the reactor was adjusted to 60° C. Subsequently, 0.24 g of 4-iodoaniline and 0.07 g of sodium nitrite ($NaNO_2$) were added to the dispersion and the resultant dispersion was maintained at 60° C. and stirred for 1 hour. The stirred mixture was cooled to room temperature and washed with DMF to remove unreacted materials therefrom. Then, the resultant solution was washed with ethanol to remove remaining DMF and then dried at 60° C. in a vacuum oven to prepare a graphene oxide with a iodine-substituted phenyl covalently bound thereto.

The prepared graphene oxide with an iodine-substituted phenyl covalently bound thereto was prepared as a suspension (1 mg/1 mL) in which 1 mg of the resultant graphene oxide was dispersed with respect to 1 mL of NMP as a solvent, and a change in the suspension was observed with time. As a result, it was confirmed that the graphene oxide with an iodine-substituted phenyl covalently bound thereto was uniformly dispersed in NMP and was stably dispersed in the solvent even after 24 hours.

The finally obtained powder-type graphene oxide with an iodine-substituted phenyl covalently bound thereto was dispersed in DMF in an amount of 0.1 parts by weight based on 100 parts by weight of DMF, and the resultant was then ultrasonically treated for 30 minutes to prepare a dispersion. Then, the dispersion was spin coated on a silicon wafer several times. The electrical conductivity of the non-heat-treated I-Ph-GO film was $2.4 \times 10^{-1}$ S/m.

Preparation Example 3

Preparation of Graphene Oxide with Phenyl Covalently Bound Thereto (Ph-GO)

0.1 g of the graphene oxide of Preparation Example 1 was added to 100 mL of a $H_2SO_4$ solution, the resultant was ultrasonically treated for 30 minutes, the dispersion was put in a reactor, and the temperature of the reactor was adjusted to 60° C. Subsequently, 0.24 g of aniline and 0.07 g of sodium nitrite ($NaNO_2$) were added to the dispersion and the resultant dispersion was maintained at 60° C. and stirred for 1 hour. The stirred mixture was cooled to room temperature and washed with DMF to remove unreacted materials therefrom. Then, the resultant solution was washed with ethanol to remove remaining DMF and then dried at 60° C. in a vacuum oven to prepare a graphene oxide with phenyl covalently bound thereto (Ph-GO).

The prepared graphene oxide with phenyl covalently bound thereto was prepared as a suspension (1 mg/1 mL) in which 1 mg of the resultant graphene oxide was dispersed with respect to 1 mL of NMP as a solvent. The dispersiblity of the graphene oxide with phenyl covalently bound thereto was lower than those of the graphene oxide with an iodine-substituted phenyl covalently bound thereto and a graphene oxide. In addition, the graphene oxide with phenyl covalently bound thereto was not dispersed in NMP after 1 hour, but was precipitated.

The finally obtained powder-type graphene oxide with phenyl covalently bound thereto was dispersed in DMF in an amount of 0.1 parts by weight based on 100 parts by weight of DMF, and the resultant was then ultrasonically treated for 30 minutes to prepare a dispersion. Then, the dispersion was spin coated on a silicon wafer several times. The electrical conductivity of the non-heat-treated Ph-GO film was 1 S/m.

Example 1

Preparation of RGO

The powder-type graphene oxide with iodine-substituted phenyl covalently bound thereto (I-Ph-GO) prepared according to Preparation Example 2 was heat treated at 300° C. for 2 hours to obtain an RGO, and the conductivity thereof was 10 S/m.

Example 2

Preparation of RGO

The powder-type I-Ph-GO of Preparation Example 2 was heat treated at 300° C. for 6 hours to obtain an RGO, and the conductivity thereof was 47,600 S/m.

Example 3

Preparation of RGO

The powder-type I-Ph-GO of Preparation Example 2 was heat treated at 430° C. for 6 hours to obtain an RGO, and the conductivity thereof was 48,700 S/m.

Comparative Example 1

Preparation of RGO

An RGO was prepared in the same manner as in Example 1, except that the graphene oxide of Preparation Example 1 was used instead of the powder-type I-Ph-GO of Preparation Example 2. The conductivity of the RGO was 0.16 S/m.

Comparative Example 2

Preparation of RGO

An RGO was prepared in the same manner as in Example 2, except that the graphene oxide of Preparation Example 1 was used instead of the I-Ph-GO of Preparation Example 2. The conductivity of the RGO was 8,300 S/m.

Comparative Example 3

Preparation of RGO

An RGO was prepared in the same manner as in Example 3, except that the graphene oxide of Preparation Example 1 was used instead of the I-Ph-GO of Preparation Example 2. The conductivity of the RGO was 8,700 S/m.

Comparative Example 4

Preparation of RGO

An RGO was prepared in the same manner as in Example 2, except that the Ph-GO prepared according to Preparation Example 3 was used instead of the I-Ph-GO of Preparation Example 2. The conductivity of the RGO was 4,200 S/m.

Example 4

Preparation of RGO-Polyimide Composites 0.050 g of the I-Ph-GO of Preparation Example 2 was added to 7 mL of NMP and ultrasonically treated for 2 hours to prepare a dispersion. Separately, 1 g of polyamic acid (PAA) was added to 3 mL of NMP and the mixture was stirred for 2 hours to prepare a solution. The prepared dispersion was added to the PAA solution and the mixture was stirred at room temperature for 10 hours to prepare a mixed solution. The mixed solution was poured into a Petri dish, and then dried in a vacuum oven at 100° C. for 24 hours to prepare a composite film in which the graphene oxide with iodine-substituted aromatic compounds covalently bound thereto was dispersed in the PAA solution in an amount of 5 parts by weight with respect to 100 parts by weight of the PAA. The thickness of the composite film was 20 to 25 mm.

The composite film was heat treated at 100° C. for 2 hours to remove remaining solvent therefrom, and the resultant composite film was then heat treated at 200° C. for 30 minutes, at 300° C. for 1 hour, and at 430° C. for 30 minutes. As a result of the heat treatment processes, an RGO-polyimide composite was obtained. The conductivity of the RGO-polyimide composites was $1.4 \times 10^{-1}$ S/m, which is $10^{13}$ times greater than that of polyimide.

Comparative Example 5

Preparation of RGO-Polyimide Composites

An RGO-polyimide composites were prepared in the same manner as in Example 4, except that the GO prepared according to Preparation Example 1 was used instead of 0.05 g of the I-Ph-GO of Preparation Example 2. The conductivity of the RGO-polyimide composites was $1.7 \times 10^{-2}$ S/m.

The conductivities of the RGOs and the RGO-polyimide composites of Examples 1 to 4 and Comparative Examples 1 to 5 are shown in Table 1 below.

TABLE 1

| | Sample name | Heat treatment conditions | Conductivity (S/m) |
|---|---|---|---|
| Example 1 | I—Ph-GO | 300° C. 2 hours | 10 |
| Example 2 | | 300° C. 6 hours | 47,600 |
| Example 3 | | 430° C. 6 hours | 48,700 |
| Example 4 | PI/I—Ph-GO (95/5 w/w) | 100° C. (2 h) → 200° C. (30 min) → 300° C. (1 h) → 430° C. (30 min) | 0.14 |
| Comparative Example 1 | GO | 300° C. 2 hours | 0.16 |
| Comparative Example 2 | | 300° C. 6 hours | 8,300 |
| Comparative Example 3 | | 430° C. 6 hours | 8,700 |
| Comparative Example 4 | Ph-GO | 300° C. 6 hours | 4,200 |
| Comparative Example 5 | PI/GO (95/5 w/w) | 100° C. (2 h) → 200° C. (30 min) → 300° C. (1 h) → 430° C. (30 min) | 0.017 |

As shown in Table 1, the RGOs and the RGO-polymer composites prepared using the method according to the present invention have a far higher electrical conductivity under the same heat treatment conditions than the RGOs and the RGO-polymer composites of Comparative Examples 1 to 5.

Figure 2:
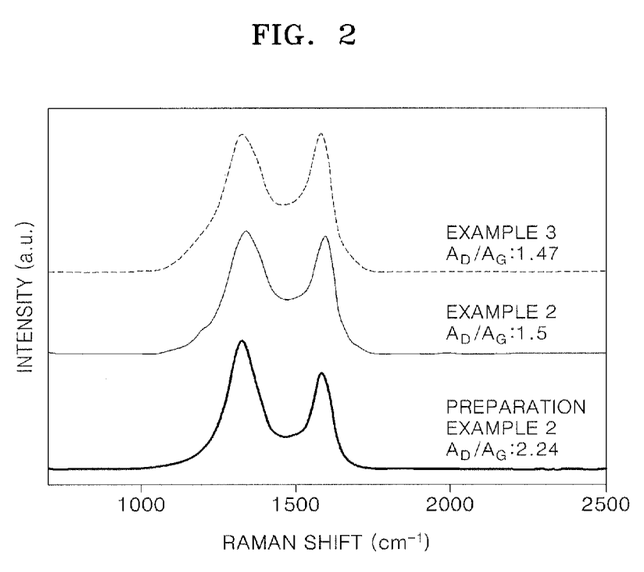
FIG. 2 is a graph showing Raman spectroscopic spectra of reduced graphene oxides prepared according to Examples 2 and 3.
Figure 3:
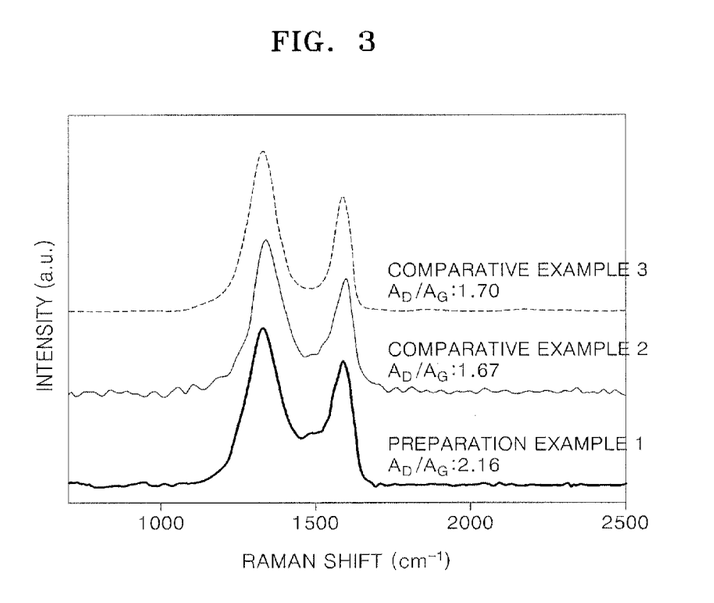
FIG. 3 is a graph showing Raman spectroscopic spectra of reduced graphene oxides prepared according to Comparative Examples 2 and 3.

Raman spectroscopic spectra of the graphene oxides and the RGOs of Preparation Example 2 and Examples 2 and 3, and Preparation Example 1 and Comparative Examples 2 and 3 are respectively illustrated in FIGS. 2 and 3. As illustrated in FIG. 2, the RGO prepared using the method according to present invention has a much smaller $A_D/A_G$ value than that of a graphene oxide before heat treatment, and thus, functional groups on a surface or an edge of the GO are detached therefrom and a carbon-carbon bond is formed as an $sp^2$ bond by carbonization and deoxygenation by a halogen group. In contrast, as illustrated in FIG. 3, the RGO prepared using a conventional method showed a more slight difference between an $A_D/A_G$ value after heat treatment and an $A_D/A_G$ value before heat treatment (graphene oxide) than the RGO prepared using the method according to present invention. From the results, it is confirmed that the graphene oxide with the halogen-substituted aromatic compounds covalently bound thereto has an increased degree of reduction and a carbon-carbon bond formed as $sp^2$ bond by carbonization and deoxygenation by the halogen group, and the RGO prepared using the method according to the present invention has improved electrical conductivity.

Figure 4:
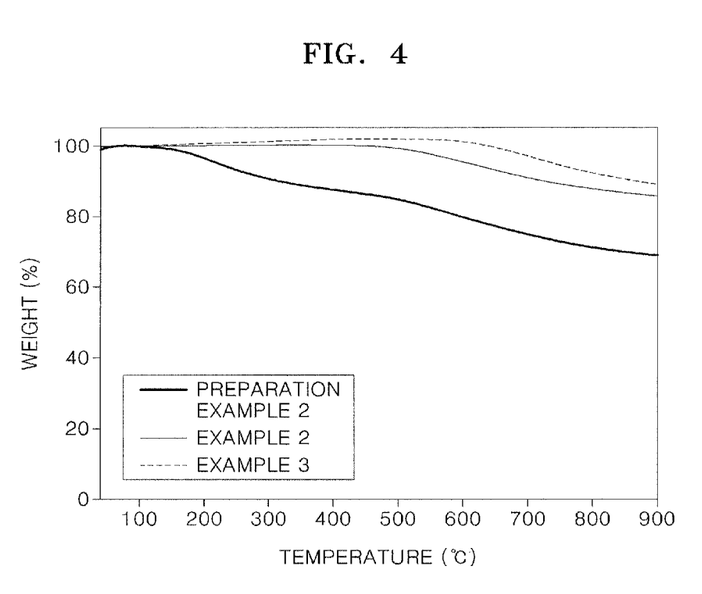
FIG. 4 is a graph showing thermogravimetric analysis (TGA) results of reduced graphene oxides prepared according to Examples 2 and 3.
Figure 5:
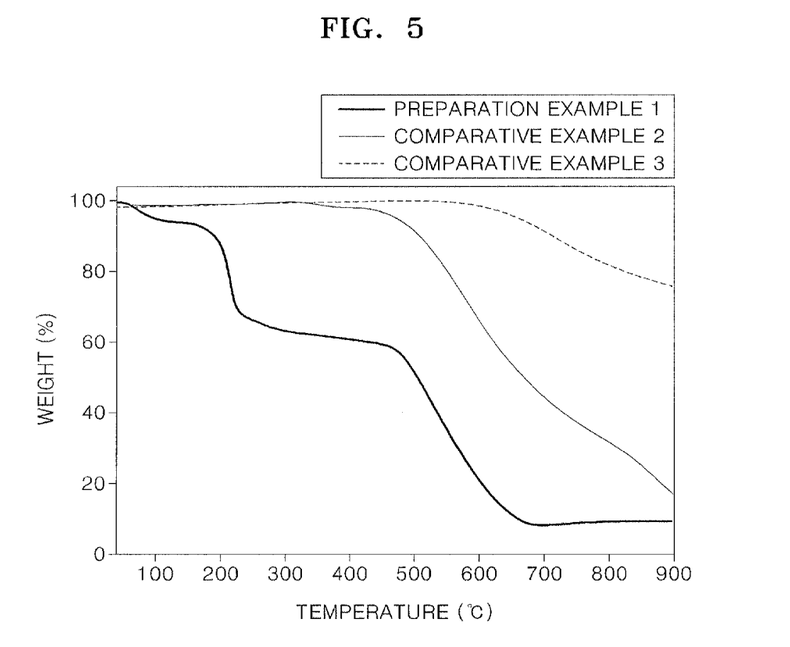
FIG. 5 is graph showing TGA results of reduced graphene oxides prepared according to Comparative Examples 2 and 3.

FIG. 4 is a graph showing thermogravimetric analysis (TGA) results of reduced graphene oxides prepared according to Examples 2 and 3 and FIG. 5 is graph showing TGA results of reduced graphene oxides prepared according to Comparative Examples 2 and 3. Referring to FIG. 4, it is confirmed that the RGO prepared using the method according to the present invention and a graphene oxide before heat treatment (Preparation Example 2) have excellent thermal stability. In contrast, as illustrated in FIG. 5, the RGO prepared using a conventional method and a graphene oxide before heat treatment (Preparation Example 1) have a relatively far lower thermal stability.

Figure 6:
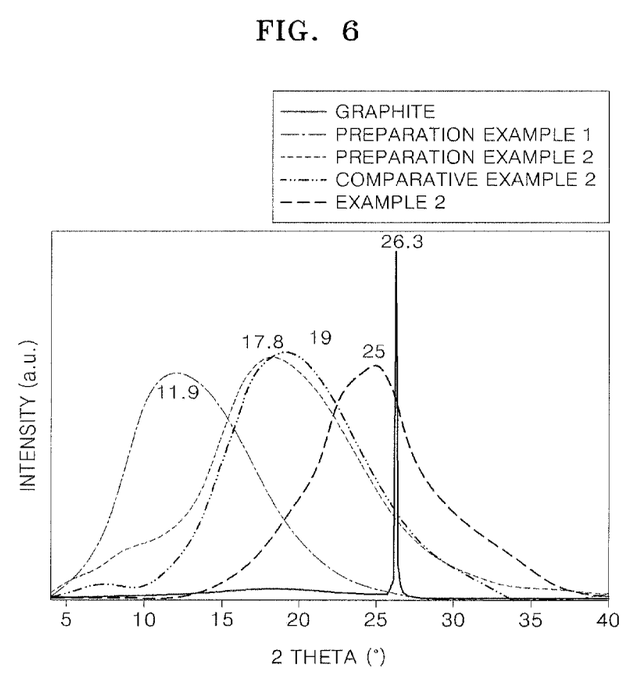
FIG. 6 is a graph showing X-ray diffraction (XRD) results of reduced graphene oxides prepared according to Example 2 and Comparative Example 2.

FIG. 6 is a graph showing X-ray diffraction (XRD) results of reduced graphene oxides prepared according to Example 2 and Comparative Example 2 and a graphene oxide before heat treatment. Referring to FIG. 6, it is confirmed that the RGO prepared using the method according to the present invention has a crystal structure that is much more similar to that of graphite than the crystal structure of the RGO prepared using a conventional method. From this result, the RGO prepared using the method according to the present invention is confirmed to have a higher degree of reduction than that of the RGO prepared using a conventional method.

Figure 7A:
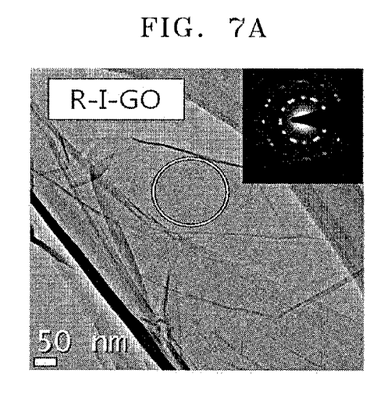
FIGS. 7A and 7B are transmission electron microscopic (TEM) images of reduced graphene oxides of Example 2 and Comparative Example 2, respectively.
Figure 7B:
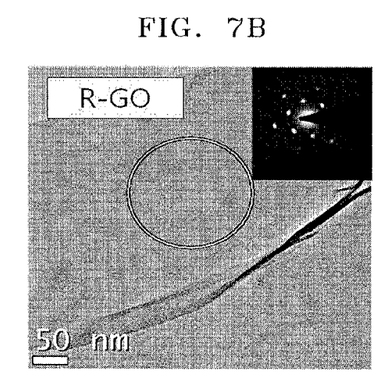

FIGS. 7A and 7B are transmission electron microscopic (TEM) images of reduced graphene oxides of Example 2 and Comparative Example 2, respectively. Referring to FIGS. 7A and 7B, it is confirmed that the RGO prepared using the method according to the present invention has a well-formed carbon-carbon bond ($sp^2$ bond).

As described above, according to the one or more embodiments of the present invention, an RGO and an RGO-polymer composite that have high electrical conductivity may be prepared through a heat treatment process at a low temperature, e.g., 450° C. or less.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a reduced graphene oxide (RGO), the method comprising:
   mixing a graphene oxide and a halogen-substituted aromatic compound;
   stirring the mixture to obtain a graphene oxide covalently bound to the halogen-substituted aromatic compounds compound; and
   heat treating the graphene oxide covalently bound to the halogen-substituted aromatic compound at a temperature in a range of 100 to 450° C. to prepare the RGO.

2. The method of claim 1, wherein the graphene oxide is prepared by treating graphite with a strong acid.

3. The method of dam 1, wherein the halogen-substituted aromatic is a compound represented by Formula 1:

R—Ar-L  <Formula 1> wherein R is H or a halogen atom, Ar is a substituted or unsubstituted $C_6$-$C_{14}$ aromatic ring, L is —OH, —COOH, —$NH_2$, —$N_2^+X^-$, or —NH—$NH_2$, where $X^-$ is a monovalent counter anion, provided that when R is H, Ar is substituted with at least one halogen atom.

4. The method of claim 3, wherein in Formula 1 Ar is a phenylene group, a naphthylene group, or an anthracenylene group.

5. The method of claim 3, wherein in Formula 1 Ar is substituted with a halogen atom or Ar is substituted with a $C_1$-$C_4$ alkyl group.

6. The method of claim 3, wherein the halogen-substituted aromatic compound of Formula 1 is selected from the group consisting of 7. The method of claim 1, wherein an amount of the halogen-substituted aromatic compound is in a range of 1 to 30 parts by weight based on 100 parts by weight of the graphene oxide.

8. The method of claim 1, wherein the covalent bond that covalently binds the graphene oxide to the halogen-substituted aromatic compound is formed on a plane or an edge of the graphene oxide.

9. The method of claim 1, wherein the halogen-substituted aromatic compound is a halogen-substituted aromatic hydrazine.

10. The method of claim 9, wherein the halogen-substituted aromatic hydrazine is halogen-substituted phenyl hydrazine or halogen-substituted naphthyl hydrazine.

11. The method of claim 9, wherein the halogen-substituted aromatic hydrazine forms a compound having an indole structure by [3,3]-sigamatropic rearrangement with the graphene oxide.

12. The method of claim 1, wherein the graphene oxide covalently bound to the halogen-substituted aromatic compound is heat treated at a temperature ranging from 100 to 450° C., for 1 to 10 hours in air or in a nitrogen atmosphere.

13. A reduced graphene oxide prepared using the method of claim 1 and having an electrical conductivity in a range of 10 to 100,000 S/m.

* * * * *